(12) United States Patent
Hurray et al.

(10) Patent No.: US 6,840,462 B2
(45) Date of Patent: *Jan. 11, 2005

(54) TWO-COMPONENT DISPENSING GUN NOZZLE

(75) Inventors: Paul Gregory Hurray, Akron, OH (US); Thomas L. Fishback, Cuyahoga Falls, OH (US); Anthony J. Taylor, Medina, OH (US)

(73) Assignee: Fomo Products, Inc., Norton, OH (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/043,755

(22) Filed: Jan. 11, 2002

(65) Prior Publication Data

US 2002/0130200 A1 Sep. 19, 2002

Related U.S. Application Data

(60) Continuation-in-part of application No. 09/471,994, filed on Dec. 23, 1999, now Pat. No. 6,345,776, and a continuation-in-part of application No. 09/982,325, filed on Oct. 17, 2001, now Pat. No. 6,527,203, which is a division of application No. 09/471,994, filed on Dec. 23, 1999, now Pat. No. 6,345,776.

(51) Int. Cl.[7] ................................................. B05B 7/10
(52) U.S. Cl. ....................... 239/413; 239/414; 239/117; 239/526; 239/595; 239/597; 222/137; 222/145.6
(58) Field of Search ................................ 239/413–415, 239/114, 115, 117, 526, 590, 599, 601, 592, 594, 595, 597; 222/137, 145, 145.6, 145.5, 256

(56) References Cited

U.S. PATENT DOCUMENTS

| | | | |
|---|---|---|---|
| 2,890,836 A | | 6/1959 | Gusmer et al. |
| 3,559,890 A | | 2/1971 | Brooks |
| 3,633,795 A | * | 1/1972 | Brooks ................. 222/134 |
| 3,784,110 A | | 1/1974 | Brooks |
| 3,799,403 A | | 3/1974 | Probst et al. |
| 4,083,474 A | | 4/1978 | Waite et al. |
| 4,169,545 A | | 10/1979 | Decker |
| 4,603,813 A | * | 8/1986 | Luegering ............... 239/399 |
| 4,676,437 A | | 6/1987 | Brown |
| 4,901,888 A | | 2/1990 | Standlick |
| 4,925,107 A | | 5/1990 | Brown |
| 5,129,581 A | | 7/1992 | Braun et al. |
| 5,219,097 A | | 6/1993 | Huber et al. |
| 5,242,115 A | | 9/1993 | Brown |
| 5,271,537 A | | 12/1993 | Johnson |
| 5,429,308 A | | 7/1995 | Brown |
| 5,462,204 A | * | 10/1995 | Finn ...................... 222/137 |
| 5,645,199 A | | 7/1997 | Schnitzler |
| 5,683,544 A | | 11/1997 | Kopp |
| 5,887,756 A | | 3/1999 | Brown |
| 6,021,961 A | | 2/2000 | Brown |
| 6,189,735 B1 | | 2/2001 | Plasmati-Luchinger |
| 6,394,369 B2 | * | 5/2002 | Goenka et al. .......... 239/601 |
| 6,527,203 B2 | * | 3/2003 | Hurray et al. ........... 239/413 |

OTHER PUBLICATIONS

TAH Mixer Sheet & Brochure dated May, 1998.

* cited by examiner

*Primary Examiner*—Dinh Q. Nguyen
(74) *Attorney, Agent, or Firm*—Buckingham, Doolittle & Burroughs, LLP; Louis F. Wagner

(57) ABSTRACT

A disposable nozzle for an airless, polyurethane spray gun has an inlet chamber section sealingly latched to the gun nose for receiving polyurethane foam components, a mixing chamber section adjacent the inlet chamber containing a static mixer for mixing the polyurethane components and a dispensing tip section adjacent the mixing chamber for discharging the polyurethane as a spray. The dispensing tip has a longitudinally extending passage terminating at a rectangular opening in the tip defined by long side edges and short side edges. The length of the long side edges are generally maintained throughout the tip passage and approximate the diameter of the mixing chamber exit to produce a consistent rectangular fan spray pattern from the nozzle. Spray guide tabs extend from the long side edges of the rectangular tip opening to alleviate nozzle drip during dispensing.

29 Claims, 5 Drawing Sheets

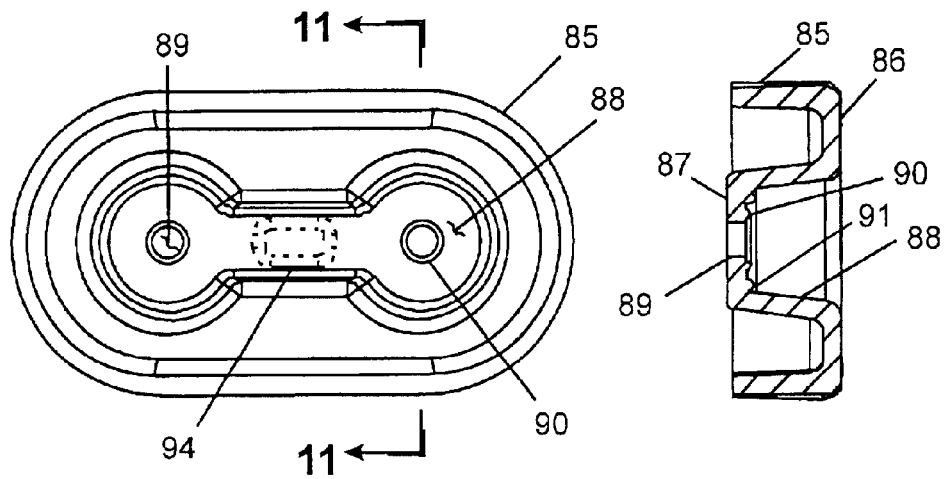
FIG. 10
FIG. 11
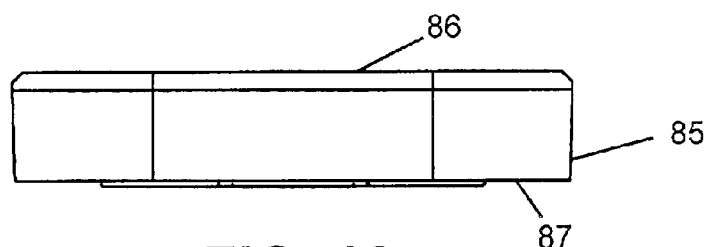
FIG. 12
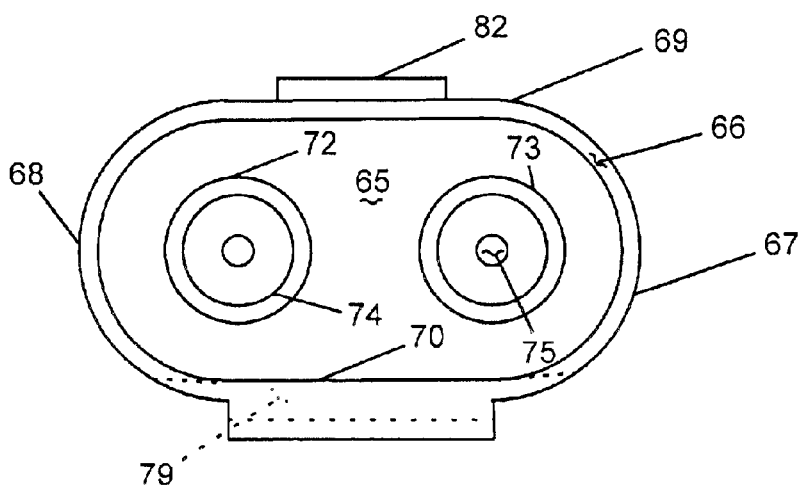
FIG. 13

TWO-COMPONENT DISPENSING GUN NOZZLE

This invention is continuation-in-part of U.S. patent application Ser. No. 09/471,994, filed Dec. 23, 1999 now U.S. Pat. No. 6,345,776 and also a continuation-in-part of U.S. patent application Ser. No. 09/982,325, filed Oct. 17, 2001, now U.S. Pat. No. 6,527,203 which in turn is a divisional application of Ser. No. 09/471,994, filed Dec. 23, 1999, now U.S. Pat. No. 6,345,776.

This invention relates generally to a dispensing apparatus for fluid products and more particularly to a nozzle for use with a hand held gun which mixes and dispenses two fluid components.

The invention is particularly applicable and will be described with specific reference to a hand held dispensing gun for dispensing a two-component polyurethane foam. However, the invention in its broader application is not limited to polyurethane foams but has application to mixing and dispensing multi-component chemicals such as polyvinyls, paints, etc.

BACKGROUND

This invention is particularly suited for in situ applications of liquid chemicals mixed and dispensed as a spray or a foam and more specifically, to in situ application of polyurethane foam or froth. In situ applications for polyurethane foam have continued to increase in recent years extending the application of polyurethane foam beyond its traditional uses in the packaging, insulation and molding fields. For example, polyurethane foam is being used with increasing frequency as a sealant in the building trades for sealing spaces between windows and door frames and the like and as an adhesive for gluing flooring, roof tiles, and the like.

Polyurethane foam for in situ applications is typically supplied as a "one-component" froth foam or a "two-component" froth foam in portable containers hand carried and dispensed by the operator through either a valve or a gun. However, the chemical reactions producing the polyurethane froth foam in a "one-component" polyurethane foam is different at time of application than the chemical reactions producing a polyurethane froth foam in a "two-component" polyurethane foam. Because the reactions proceed differently, the dispensing of the chemicals for a two-component polyurethane foam involves different and additional concepts and concerns than that present in the dispensing apparatus for a "one-component" polyurethane froth foam.

A "one-component" foam generally means that both the resin and the isocyanate used in the foam formulation are supplied in a single pressurized container and dispensed from the container through a valve or a gun attached to the container. When the chemicals leave the valve, a reaction with moisture in the air produces a polyurethane froth or foam. Thus, the design concerns related to an apparatus for dispensing one-component polyurethane foam essentially concerns the operating characteristics of how the one-component polyurethane foam is throttled or metered from the pressurized container. Reference, for example, can be had to U.S. Pat. No. 5,887,756 to Brown, issued Mar. 30, 1999 and U.S. Pat. No. 5,645,199 to Schnitzler, issued Jul. 8, 1997. While one-component guns can variably meter the polyurethane froth, they are typically used in caulk/glue applications where an adhesive or caulk bead is determined by the nozzle configuration. Post drip is a major concern in such applications as well as the dispensing gun not clogging because of reaction of the one component formulation with air (moisture) within the gun. To address or at least partially address such problems, a needle valve seat is typically applied as close to the dispensing point by a metering rod arrangement which can be pulled back for cleaning. While metering can occur at the needle valve seat, the seat is primarily for shut-off to prevent post drip, and depending on gun dimensioning, metering may principally occur at the gun opening.

In contrast, a "two-component" froth foam means that one principal foam component is supplied in one pressurized container, typically the "A" container (i.e., polymeric isocyanate, fluorocarbons, etc.) while the other principal foam component is supplied in a second pressurized container, typically the "B" container (i.e., polyols, catalysts, flame retardants, fluorocarbons, etc.) Examples of two-component dispensing guns in commercial use today may be found in assignee's U.S. Pat. No. 5,429,308, to Brown, issued Jul. 4, 1995 and U.S. Pat. No. 5,242,115 to Brown, issued Sep. 7, 1993 and in the parent application incorporated by reference herein. Additional commercial applications include U.S. Pat. No. 5,462,204 to Finn, issued Oct. 31, 1995; U.S. Pat. No. 5,129,581 to Braun et al., issued Jul. 14, 1992; and, U.S. Pat. No. 4,925,107 to Brown, issued May 15, 1990. These guns are improvements over early two-component dispensing gun designs such as shown in U.S. Pat. No. 2,890,836 to Gusmer et al., issued Jun. 16, 1959; U.S. Pat. No. 3,559,890 to Brooks, issued Feb. 2, 1971; and, U.S. Pat. No. 3,784,110 to Brooks, issued Jan. 8, 1974.

In a two-component polyurethane foam, the "A" and "B" components form the foam or froth when they are mixed in the gun nozzle. Of course, chemical reactions with moisture in the air will also occur with a two-component polyurethane foam after dispensing, but the principal reaction forming the polyurethane foam occurs when the "A" and "B" components are mixed or contact one another in the dispensing gun nozzle. The dispensing apparatus for a two-component polyurethane foam application has to thus address not only the metering design concerns present in a one-component dispensing apparatus, but also the mixing requirements of a two-component polyurethane foam.

Further, a "frothing" characteristic of the foam (foam assumes consistency resembling shaving cream) is enhanced by the fluorocarbon (or similar) component, which is present in the "A" and "B" components. This fluorocarbon component (HFC or HCFC) is a compressed gas which exits in its liquid state under pressure and changes to it gaseous state when the liquid is dispensed into a lower pressure ambient environment, such as when the liquid components exit the gun and enter the nozzle of the gun to which this invention relates.

While polyurethane foam is well known, the formulation varies considerably depending on application. In particular, while the polyols and isocyanates are typically kept separate in the "B" and "A" containers, other chemicals in the formulation may be placed in either container (but generally the chemical additives are placed in the "B" side) with the result that the weight or viscosity of the liquids in each container varies as well as the ratios at which the "A" and "B" components are to be mixed. In the nozzle for the dispensing gun applications which relate to this invention, the "A" and "B" formulations are such that the mixing ratios are generally kept equal so that the "A" and "B" containers are the same size. However, the weight, more importantly the viscosity, of the liquids in the containers invariably vary from one another. To adjust for viscosity variation between "A" and "B" chemical formulations, the "A" and "B" containers are charged with differing concentrations of HFC or HCFC component typically with an inert gas at different or similar pressures to achieve equal flow rates. The metering valves in a two-component gun, therefore, have to meter different liquids at their separate pressures at a precise ratio under varying flow rates. For this reason (among others), some dispensing guns have a design where each metering rod/valve is separately adjustable against a separate spring to compensate not only for ratio variations in different formulations but also viscosity variations between the components. The typical two-component dispensing gun in use today can be viewed as two separate one-component dispensing guns in a common housing discharging their components into a mixing chamber or nozzle.

Besides the ratio control which distinguishes two-component dispensing guns from one-component dispensing guns, a concern which affects all two-component gun designs (not present in one-component dispensing guns) is known in the trade as "cross-over". Generally, "cross-over" means that one of the components of the foam ("A" or "B") has crossed over into the dispensing mechanism in the dispensing gun for the other component ("B" or "A"). Cross-over may occur, for example, when the pressure variation between the "A" and "B" cylinders becomes significant. Variation can become significant when the foam formulation initially calls for the "A" and "B" containers to be at high differential charge pressures and the containers have discharged a majority of their components. (The containers are accumulators which inherently vary the pressure as the contents of the container are used.) Another example of a cause of cross-over is nozzle clogging or obstruction (discussed further below).

Related to cross-over and affecting the operation of a two-component gun is the design of the nozzle. The nozzle is a throw away item detachably mounted to the gun nose. Nozzle design is important for cross-over and metering considerations in that the nozzle directs the "A" and "B" components to a static mixer in the gun. One gun described in U.S. Pat. No. 5,462,204 completely divides the nozzle into two passages by a wall extending from the nozzle nose (gun face) to the mixer. The wall lessens but does not eliminate the risk of cross-over since the higher pressurized component must travel into the mixer and back to the lower pressure metering valve before cross-over can occur. However, the nozzle design illustrated in the '204 patent may be limited because of the wall and nozzle inlet chamber tending to create turbulence for applications requiring very high flow rates.

A still further characteristic distinguishing two-component from one-component gun designs resides in the clogging tendencies of two-component guns. Because the foam foaming reaction commences when the "A" and "B" components contact one another, it is clear that, once the gun is used, the static mixer will clog with polyurethane foam or froth formed within the mixer. This is why the nozzles, which contain the static mixer, are designed as throw away items. In practice, the foam does not instantaneously form within the nozzle upon cessation of metering to the point where the nozzles have to be discarded. Some time must elapse. This is a function of the formulation itself, the design of the static mixer and, all things being equal, the design of the nozzle.

The spray pattern produced by the nozzle is important. Typically, the nozzle tip is simply the circular end of a tube producing a cone fan pattern. However, reference can be had to assignee's U.S. Pat. No. 5,429,308 which discusses a flared or funnel nozzle for producing a fan shaped spray and to U.S. Pat. No. 5,129,581 which discloses a "V" notch in the nozzle tip and has been well received within the industry. What is required is a nozzle that produces a consistent fan spray pattern, preferably a well defined pattern, which can be maintained at full throttle flow of the components and at throttled or "fine" flow of the components. In addition, the consistency of the flow pattern has to be maintained notwithstanding the fact that the pressure of the liquid components flowing through the gun drops as the pressurized containers (for portable gun application) dispel their foam producing components.

Even when a well defined spray pattern is produced under all operating conditions of the nozzle, other considerations are of major concern. If at all possible, nozzle drip has to be avoided. Nozzle drip conventionally means that a foam buildup occurs at the nozzle tip resulting in dripping during gun operation.

Another important requirement for a "good" nozzle is the time it takes for the nozzle to "clog" after the gun has been shut off. The nozzle is a throw away component and inevitably the foam components will react and produce foam in the nozzle, clogging the nozzle. In many applications, the gun is used intermittently. For example, a mold may be filled or a part sprayed and measurements initially taken after which additional coating may have to be sprayed. Generally speaking, a "plug" is formed in the nozzle when the gun stops spraying. The "plug" grows over time. If the gun is activated after spraying and the "plug" has not grown significantly, the plug" will be discharged from the gun on reactivation and the gun will continue to function. For polyurethane foam applications, nozzles have been known to clog within thirty seconds and some gun/nozzle applications can be idled for up to 4½ to 5 minutes without clogging. In all cases, nozzle/gun design, formulation and environmental conditions are contributing factors.

The dispensing guns cited when equipped with the inventive nozzle are additionally characterized and distinguished from other types of multi-component dispensing guns in that they are "airless" and do not contain provisions for cleaning the gun. That is, a number of dispensing or metering guns or apparatus, particularly those used in high volume foam applications, are equipped or provided with a means or mechanism to introduce air or a solvent for cleaning or clearing the passages in the gun. The use of the term "airless" as used in this patent and the claims hereof means that the dispensing apparatus is not provided with an external, cleaning or purging mechanism.

While the two-component dispensing guns discussed above function in a commercially acceptable manner, it is becoming increasingly clear as the number of in situ applications for polyurethane foam increase, that the range or the ability of the dispensing gun to function for all such applications has to be improved. As a general example, the dispensing gun design has to be able to throttle or meter a fine bead of polyurethane froth in a sealant application where the kit is sold to seal spaces around window frames, door frames, and the like in the building trade. In contrast, where the kit is sold to form insulation, an ability to meter or flow a high volume flow of chemicals is required. Still yet, in an adhesive application, liquid spray patterns of various widths and thickness are required. Additionally, there are yet other desirable configurations for the filling of molds. While the "A" and "B" components for each of these applications are specially formulated and differ from one another, one dispensing gun for all such applications involving different formulations of the chemicals is needed, and the nozzle applied to the gun must be able to spray the components in a consistent manner over the wide operating range requirements of the gun.

SUMMARY OF THE INVENTION

Accordingly, one of the major undertakings of the present invention is to provide an improved, nozzle for use with an airless two-component dispensing gun which can produce consistent spray patterns while the gun meters the foam over a wide flow range.

This undertaking is achieved by means of a detachable, throw away nozzle for use with an airless, liquid spray dispensing gun having a plurality of valve openings through which pressurized liquids are dispensed. The nozzle has an inner chamber section adjacent to and in sealing engagement with the valved openings, a mixing chamber section adjacent to the inner chamber and containing a static mixer therein and a dispensing tip adjacent the mixing chamber and through which the liquids are dispensed from the nozzle. The dispensing tip, mixing chamber and inner chamber extend along a longitudinal axis and are generally symmetrical thereabout. The dispensing tip is defined by a longitudinally extending, interior passage through which the liquids are dispensed. The tip passage has a generally circular entrance end at the intersection of the tip passage with the mixing chamber, and at its longitudinally opposite exit end, the tip end has a rectangular dispensing opening defined by a pair of long side length edges joined at each end by a pair of short side width edges. Importantly, long side edges are approximately equal to the diameter of the exit end of the mixing chamber and this long side distance is maintained throughout the longitudinal distance of the dispensing tip passage. Thus, the length of the rectangular opening is maintained generally constant throughout the length of the dispensing tip while the tip interior passage tapers to the width of the rectangular opening from the inlet end of the tip passage. By establishing a rectangular opening and maintaining its long side dimension while funneling the passage to the short side of the rectangular opening, consistent rectangular fan spray patterns result over a wide range of liquid pressures and flow rates.

In accordance with a more specific feature of the invention, the dispensing tip passage is configured such that the short side edges extend as a first surface from the rectangular opening towards the mixing chamber as flat surfaces tapering outwardly until blending into the circular exit of the mixing chamber. The long side edges extend into the passage as a curvilinear second surface blending into the mixing chamber circular exit end and blending from the rectangular tip opening as a generally flat surface whereby a transition from a cylindrical nozzle passage to a cubic, box-like passage smoothly takes place without inducing significant back pressures and/or turbulent flows in the dispensing tip passage.

In accordance with another important aspect of the invention, a spray guide tab protrusion extends longitudinally from each long side edge of the rectangular opening. Each tab has an exposed circumferential edge extending from the intersection of one short side edge with a long side edge of the rectangular opening to the intersection at the opposite end of the long side edge with the opposite short side edge. Preferably, circumferential edge is curvilinear and more preferably circular so that the tabs not only provide a fan shaping guide conduit but also, and somewhat surprisingly, alleviate drip when the gun operates.

In accordance with another aspect of the invention and in combination with the configuration of the dispensing tip, the cross-sectional area of the inlet chamber at a position adjacent the nose surface of the dispensing gun is larger than the cross-sectional area of the inlet chamber at its intersection with the mixing chamber. The inlet chamber is generally formed as a truncated cone which funnels each component along the walls thereof into the mixing chamber in a manner which alleviates turbulent flow of the liquid components and tends to maintain the components unmixed until reaching the static mixer. An advantage of this nozzle design is the increase in "clogging time", a desirable feature, which is the time it takes curing foam to clog an attached nozzle after a gun has been recently used. The nozzle configuration tends to keep the components unmixed in the inlet chamber and the tip dispensing passage avoids flow restrictions, where "plugs" could otherwise form by maintaining the length of the rectangular opening generally constant throughout the tip passage. By maintaining the dimensions of the dispensing tip and mixing chamber somewhat constant, back pressure which could otherwise contribute to plug formation in the inlet chamber is alleviated.

In accordance with a further aspect of the invention and in combination with the features previously described, an improvement is provided in a detachable nozzle for use in a two-component dispensing gun having a pair of valve seat openings formed in two protrusions which extend from the nose of the gun through which each component is dispensed. The improved nozzle has a back plate filling and closing one end of the nozzle and the back plate has a pair of cup shaped recesses for receiving the protrusions when the nozzle is attached to the dispensing gun with the back plate adjacent or abutting the nose of the dispensing gun. Each cup shaped recess has a valve extension seat opening which is in registry with the valve seat opening in each protrusion. The back plate and the nozzle in the valve seat protrusions extending from the gun's nose are plastic and the exterior surface of the base of the cup shaped recess has at least one inner sealing ring concentric with the valve seat extension opening formed in the recess. Importantly, and working in tandem with the inner sealing ring is an outer sealing ring extending from and concentric with the base of each recess opening and adapted to sealingly contact the flat nose surface of the gun. By selecting plastics of different hardness, the inner sealing rings resiliently deform or are resiliently deformed by the end face of the protrusion and the outer sealing rings more resiliently deform or are more resiliently deformed by the gun nose surface when the nozzle is clamped by its latch to the dispensing gun to assure sealing of the nozzle to the gun.

In accordance with another aspect of the invention an improved dispensing polyurethane foam dispensing gun is provided which generally has a straight-through foam metering, mixing and dispersion characteristic. Straight through metering results from axial metering rods receiving "A" and "B" components in somewhat longitudinally aligned feed passages. Straight through flow is maintained in the nozzle inlet chamber, throughout the cylindrical mixing chamber (where the components are mixed) and finally in the dispensing tip passage which narrows the stream to a rectangular discharge slit while keeping the straight through characteristics of the design intact. By avoiding bends in the flow paths, a dispensing gun is produced which has excellent metering and high flow characteristics throughout its range of operation.

It is thus a general aspect of the invention to provide an improved, disposable nozzle for airless liquid spray guns.

It is another feature of the invention to provide an improved nozzle for polyurethane spray gun applications which is universal in the sense that it can be used with a wide range of "A" and "B" liquid components having a wide range of viscosity and a wide range of pressures and mass flow.

It is another feature of the invention to provide an improved nozzle for use with a polyurethane spray gun which alleviates the problem of nozzle drip.

Yet another aspect of the invention is the provision of an improved nozzle for use with a polyurethane spray gun which, in and of itself, tends to extend the time that which the nozzle will clog upon gun shut off.

Still yet another feature of the invention is the provision of an improved nozzle for use with an airless, polyurethane type spray gun which produces a rectangular fan spray pattern having relatively sharp edges and a substantially uniform dispersion of the spray product throughout the fan pattern.

Still another object of the invention is the provision of a polyurethane foam spray gun with a detachable nozzle that produces excellent spray patterns throughout the range of gun operating conditions.

Still another object of the invention is an improved gun/nozzle configuration having an improved double seal protrusion/recess configuration for positively aligning and sealing the detachable nozzle to the gun body.

These and other objects, features and advantages of the present invention will become apparent to those skilled in the art upon reading and understanding the Detailed Description of the Invention set forth below taken in conjunction with the drawings.

BRIEF DESCRIPTION OF THE DRAWINGS

The invention may take form in certain parts and arrangement of parts taken together and in conjunction with the attached drawings which form a part of the invention and wherein:

FIG. 10 is a front view of the back plate used in the nozzle of the present invention;

FIG. 11 is a sectioned view of the back plate taken generally along the lines designated 11—11 of FIG. 10;

FIG. 12 is a top view of the back plate, and

FIG. 13 is a front view of the nose surface of the dispensing gun preferably used with the nozzle of the present invention.

DETAILED DESCRIPTION OF THE INVENTION

Figure 1:
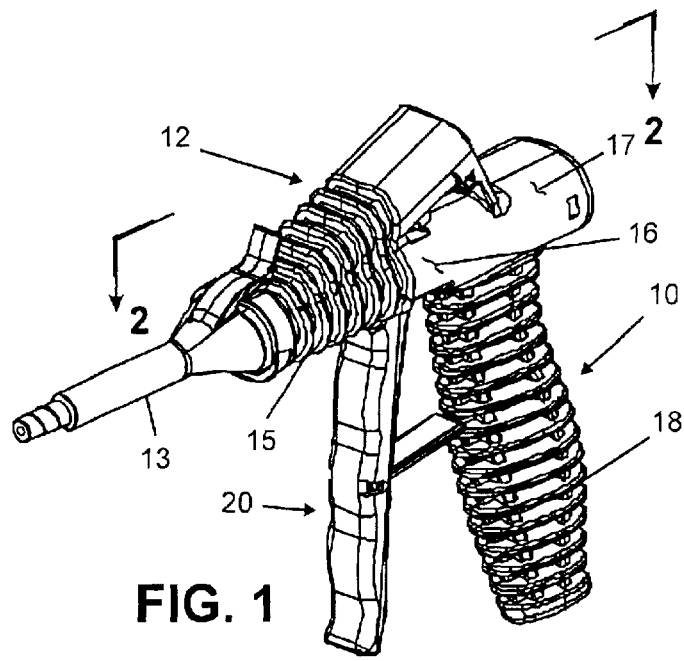
FIG. 1 is a perspective view of a dispensing gun having a nozzle similar to that of the present invention but lacking the dispensing nozzle tip.
Figure 2:
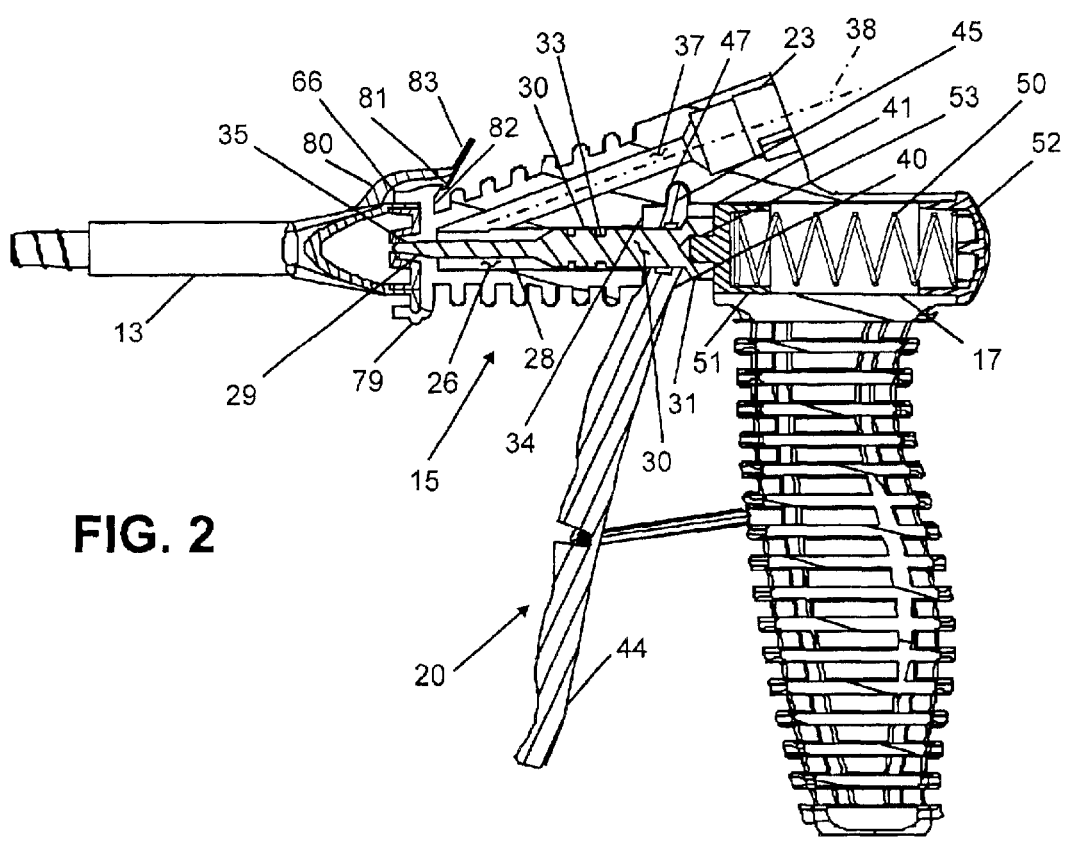
FIG. 2 is a section view of the dispensing gun taken generally along line 2—2 of FIG. 1.

Referring now to the drawings wherein the showings are for the purpose of illustrating preferred and alternative embodiments of the invention and not necessarily limiting the invention, there is shown in perspective view in FIG. 1, an airless (as that term is defined in the Background) two-component dispensing gun 10. Dispensing gun 10 may be viewed as comprising a one-piece gun body 12 (which includes components to be described) to which is detachably secured a disposable nozzle 13. Reference can and should be had to parent U.S. application Ser. No. 09/471,994 (incorporated herein by reference) for a more detailed explanation of the of the operation and structure of gun 10 than that provided herein. In addition, FIGS. 1 and 2 are extracted from the parent application and show a nozzle having a conventional dispersing tip producing a cone shaped spray pattern. It is to be appreciated that in the preferred embodiment, dispersing gun 10 is sold as a part of a polyurethane foam dispensing kit, including portable "A" and "B" cylinders, hoses, gun and several different nozzles producing different spray patterns. All nozzles have similar and unique inlet and mixing chambers for reasons explained below. The nozzle in the preferred embodiment has, in addition, a unique dispensing tip.

Gun body 12 may be further defined as having integral portions including a longitudinally-extending valve portion 15 to which nozzle 13 is connected and terminating at a longitudinally-extending trigger portion 16, in turn, terminating at a longitudinally-extending spring portion 17 from which transversely extends a handle portion 18. Within gun body housing 12 is a pair of canted hose openings to which the "A" and "B" hoses (not shown) are attached by conventional quick connect couplings or retaining mechanisms. Dispensing gun 10 is also provided with a trigger 20 extending within trigger body portion 16.

Referring now to FIG. 2, dispensing gun 10 is shown in a vertical cross-section view. In gun body valve portion 15, there is formed a pair of parallel, open ended, laterally displaced and straight metering passages which are identical to one another so that a description of one dispensing passage such as a metering passage 26 for component "A" as shown in FIG. 2 will apply to the other metering passage. Within each dispensing passage is placed a longitudinally-extending metering rod 28 that has a tip section 29 at one end terminating in an intermediate sealing section 30, in turn, terminating at a yoke collar section 31 at the opposite end of metering rod 28. Metering rod sections 29, 30 and 31 are cylindrical in the preferred embodiment but conceptually could be tubular. Each metering rod 28 has a pair of grooves 33 for an O-ring seal (not shown) to prevent the liquid component in metering passage 26 from escaping out an end opening 34 in metering passage 26 through which intermediate sealing section 30 extends. The opposite end opening of each metering passage 26 is formed as an especially configured valve seat 35.

Figure 7:
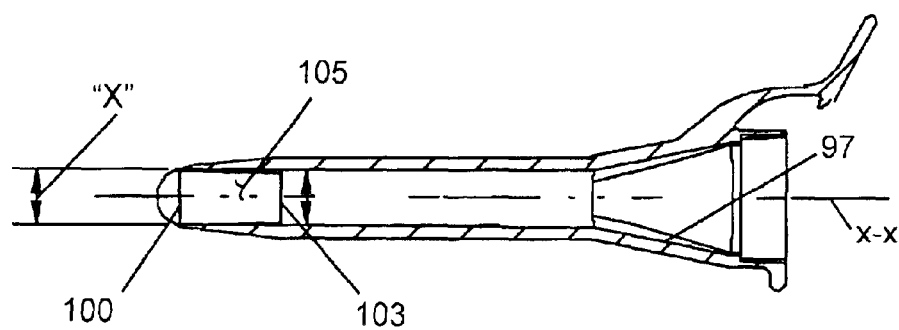
FIG. 7 is a sectioned view of the nozzle of the present invention taken along lines 7—7 of FIG. 3.
Figure 8:
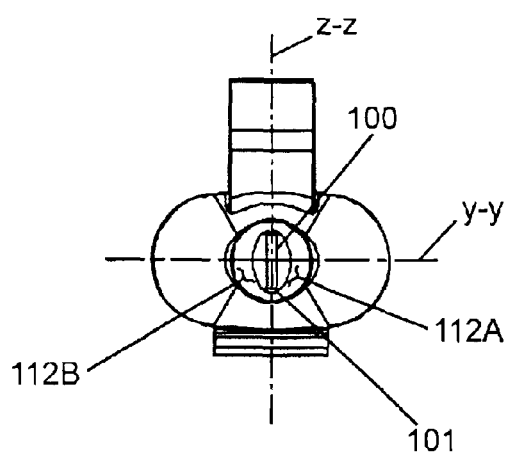
FIG. 8 is a front view of the nozzle of the present invention.
Figure 9:
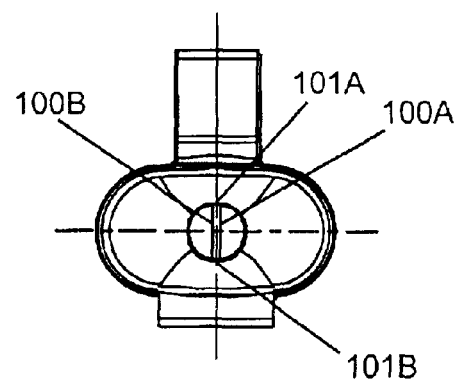
FIG. 9 is a rear view of the nozzle of the present invention.

For consistency in terminology, when describing dispensing gun 10, "longitudinal" will refer to the direction of the dispensing gun along the long axis of metering passage 26 or metering rods 28, i.e., x—x plane; "transverse" will refer to the direction of the gun along the long axis of handle portion 18, i.e., z—z plane; and, "laterally" will refer to the direction of the gun such as the distance spanning the spacing between metering passages i.e., the y—y plane. The planes are labeled in FIGS. 7 and 8.

Within valve body portion 15 are two laterally spaced and straight feed passages 37 (only one shown in FIG. 2) in fluid communication at one end with a hose opening 23 and at the opposite end with a metering passage 26 at a position in a metering passage adjacent valve seat 35. Feed passage 37 extends along an axis 38 which forms an acute angle of about 20° with metering passage 26, preferably extending not greater than about 30°. The geometric arrangement of a longitudinally-extending dispensing passage through which a sealed metering rod extends with a feed passage in-between the metering tip of the metering rod and the rod seal is somewhat similar to conventional arrangements used in one-component dispensing guns such as sold by the assignee of the present invention and examples of which may be found in U.S. Pat. No. 5,887,756 to Brown, issued Mar. 30, 1999; U.S. Pat. No. 5,683,544 to Kopp, issued Nov. 4, 1997; and U.S. Pat. No. 5,645,199 to Schnitzler, issued Jul. 8, 1997. However, the one-component guns introduce the one-component foam at a position spaced from the dispensing passage's valve seat and form angles with the feed passages larger than the acute angle of the present invention. Based on a review of existing two-component gun designs, it was concluded that improved metering of the dispensing gun is achieved if turbulent flow of the "A" and "B" components through the dispensing gun can be alleviated or minimized. Simply put, if abrupt changes in flow direction of the liquid foam components within the gun are avoided, improved gun operation will result. The arrangement of feed passage 37, metering passages 26 and metering rod 28 is believed to alleviate or reduce turbulent flow of the liquid components through dispensing gun 10. As will be explained further below, the non-turbulent characteristics present in gun body 12 of the present invention is carried through in the design of nozzle 13.

Referring still to FIGS. 1 and 2, trigger 20 has a yoke crossbar portion 40 with a pair of elongated metering rod openings 41 formed therein through which intermediate sealing section 30 of each metering rod extends. Extending transversely from yoke crossbar portion 40 of trigger 20 in the direction of handle 18 is a recessed trigger lever 49. Transversely extending from the opposite side of yoke crossbar portion 40 is a rounded trigger pivot portion 45. Trigger pivot portion 45 fits within a U-shaped trigger recess 47 formed within trigger body portion 16. Trigger pivot portion 45 is not pinned or journaled within U-shaped recess 47 and can be viewed as floating. Movement of trigger lever 44 causes trigger pivot 45 to pivot within trigger recess 47 moving yoke crossbar 40 into contact with yoke collar section 31 of each metering rod 28 in a manner which causes metering of the "A" and "B" liquid components.

Within spring body portion 17 of dispensing gun 10, which is open ended, is positioned a single spring 50. Spring 50 is compressed between an inner spring retainer 51 and an outer spring retainer 52 which has a bayonet clip that snaps into openings in spring body portion 17 (FIG. 1). Alternatively, a spring bar retainer can be used. Inner spring retainer 51 has a pair of tubular projections 53 extending therefrom which fit within openings formed in the rear surface of yoke collar section 31. The design of inner spring retainer 51 thus provides a form of alignment assuring equal travel of metering rod 28 in metering passage 26.

Figure 3:
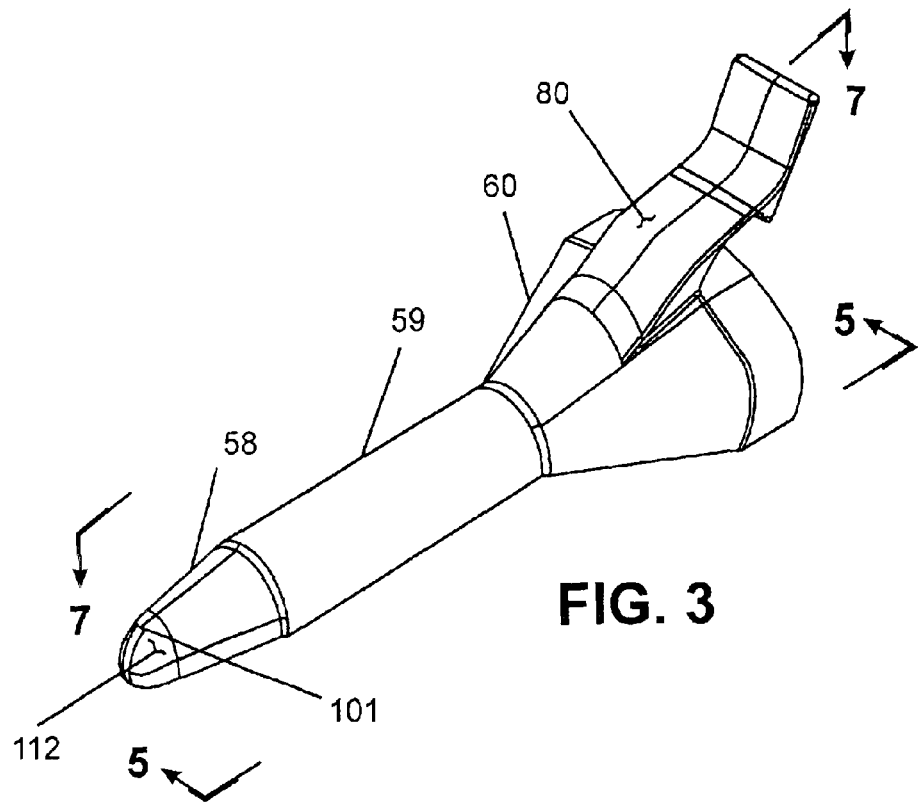
FIG. 3 is a perspective view of the nozzle of the present invention.
Figure 4:
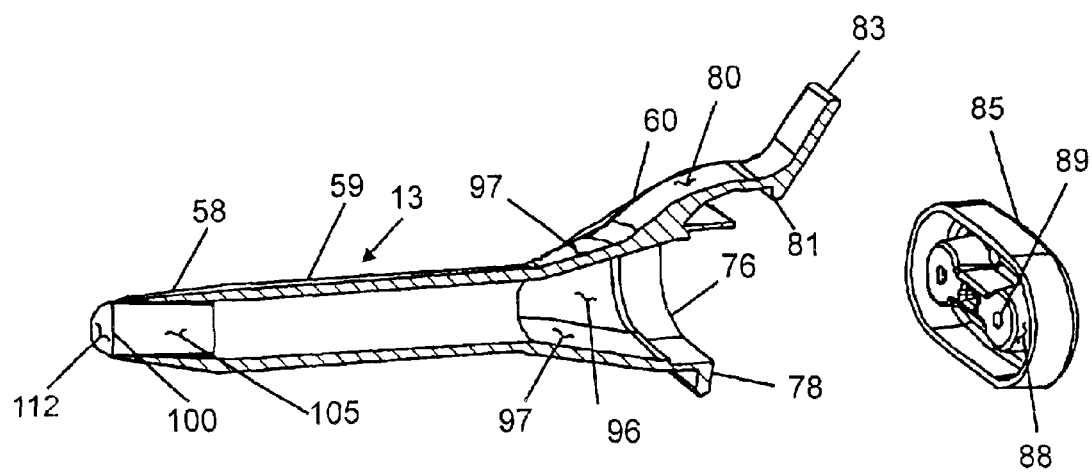
FIG. 4 is an exploded sectioned view of the nozzle shown in FIG. 3.
Figure 5:
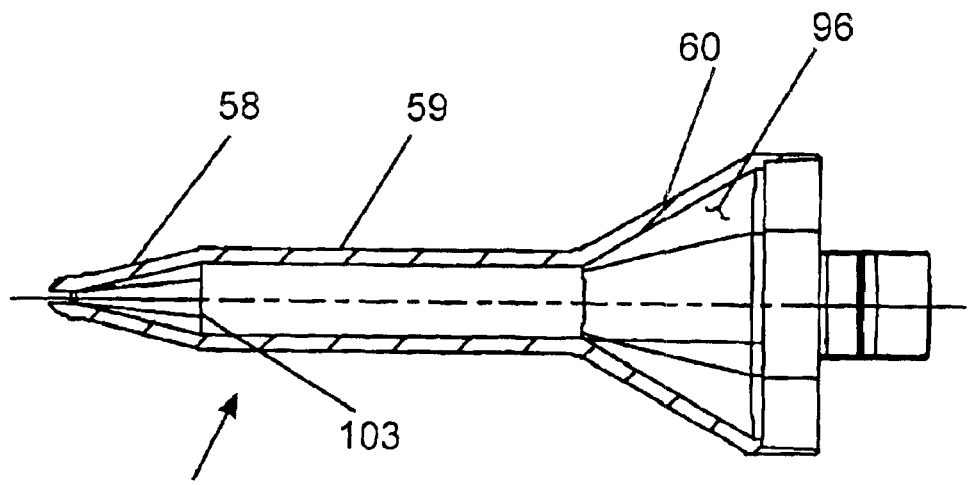
FIG. 5 is a sectioned view of the nozzle taken along lines 5—5 of FIG. 3.

Referring now to FIGS. 3, 4 and 5, nozzle 13 has an outlet tip section or tip 58, a mixing chamber section or a mixing chamber 59 and an inlet chamber section or inlet chamber 60. Nozzle 13 is molded so that each section, 58, 59, 60 is an integral part of nozzle 13. Conceptually, dispensing tip 58 could be separately molded and threaded into mixing chamber. However, because certain dimensional relationships are desired for the preferred embodiment which relate to the diameter of the mixing chamber, there is no particular advantage to making the dispensing tip separate. In fact, for the preferred embodiment, it is desired to have a vertical spray pattern best achieved by making tip 58 an integral part of nozzle 13. Not shown in the drawings (for drawing clarity purposes) is a conventional, longitudinally extending static mixer which substantially occupies the cylindrical passage within mixing chamber 59. In the preferred embodiment, a static mixer marketed by TAH Industries, Inc. under its brand name "Stata-tube" has been used with good results.

Nozzle design is essential to the proper functioning of any two-component dispensing gun. In accordance with the invention, inlet chamber 60 introduces the "A" and "B" components to a static mixer (not shown) in mixing chamber 58 in a somewhat non-turbulent manner and with only minimal contact between the "A" and "B" components so that the static mixer can effectively perform its mixing function. More particularly, the shape, construction and relationship of inlet chamber 60 relative to metering passage 26 and relative to mixing chamber 59 is important. Referring now to FIG. 13 and FIG. 2, metering passage 26 exits valve gun portion 15 at a flat nose surface 65 in valve body portion 15. Flat nose surface 65 is defined by an edge from which an edge lip 66 protrudes. Edge lip 66, in the preferred embodiment, is defined by two identical, laterally spaced semi-circular edge portions 67, 68 connected to one another by laterally extending straight edge portions 69, 70 transversely spaced from one another. Alternatively, and perhaps conceptually preferable, edge lip 66 could be circular.

Longitudinally-extending from nose surface 65 and concentric with semi-circular edge lip portion 67, 68 are a pair of valve seat protrusions 72, 73 forming or continuing the metering tip valve seats of metering passage 26. Each valve seat protrusion 72, 73 has a flat end surface 74 through which a central valve seat opening 75 extends. Valve seat opening is the minor diameter of a frusto-conical surface which defines valve seat 35 in the preferred embodiment and is the open end of metering passage 26.

Referring to FIGS. 2, 3, 4 and 5, inlet chamber 60 of nozzle 13 has a collar section 76 extending from its entrance end which is in the shape of nose edge and fits within nozzle edge lip 66. Extending laterally and transversely from the bottom portion of collar section 76 is a positioning tab 78. When nozzle 13 is applied to dispensing gun 10, positioning tab 78 fits within a nozzle recess 79 best shown as extending between dash lines in FIG. 13 and shown in cross-section in FIG. 2. Extending transversely upward from collar section 76 is a latch 80 which has a lock surface 81 adapted to engage a snap ledge 82 longitudinally-extending from nose edge lip 66 in the rearward direction. To apply, the gun operator grasps nozzle 13 by its dispersing tip 58 and mixing chamber 59 and inserts positioning tab 78 into nozzle recess 79. At this point, nozzle 13 will be at a slight downward angle relative to gun nose surface 65. As the remaining portion of collar section 76 is brought within edge lip 66, positioning tab 78 will rotate within nozzle recess 79 so that snap ledge 82 will snap into locking engagement with lock surface 81. To remove nozzle 13, the gun operator lifts a latch tip 83 formed in latch 80 to unseat lock surface 81 on snap ledge 82. Nozzle 13 can then be rotated so that positioning tab 78 can be lifted from nozzle recess 79. The latch mechanism described in the preferred embodiment is particularly preferred because the rigidity of latch 80 can be designed in combination with the lever force exerted by the operator to achieve desired sealing of nozzle 13 to gun body 12. Other arrangements which will produce desired sealing can be employed. However, the snap latch disclosed is preferred for reasons stated.

Referring now to FIGS. 4, 10, 11 and 12, a backplate 85 having an edge configuration similar to collar section 76 is permanently affixed to collar section 76 of nozzle 13. Backplate 85 is sealed to nozzle collar section 76 about its entire periphery. Because nozzle 13, in the preferred embodiment, is an ABS plastic, it lends itself to "solvent welding" with a variety of common solvents. Other methods of sealingly attaching backplate 85 to nozzle collar section 76 are possible. Backplate 85 has a back surface 86 and a front surface 87 shaped as shown to provide a pair of cup shaped recesses 88 opening to nozzle face surface 65. At the base of each cup shaped recess 88 is a valve extension opening 89 and a inner sealing rib 90 extends from the base of cup shaped recess 88 circumscribing valve seat extension opening 89. Inner rib 90 thus contacts flat end surface 74 of each valve seat protrusion when nozzle 13 is latched to gun body 12. Because the plastic composition of nozzle 13 has a different hardness than the plastic composition of body 12, a deformation will occur between sealing lip 90 and flat end surface 74 with the positive lock nozzle arrangement described above. In addition, also protruding from each cup shaped recess is an annular outer sealing rib 91 concentric with the valve seat extension opening 89. Importantly, outer sealing rib 91 is dimensioned so that it sealingly deforms more readily than inner sealing rib 90. Note the larger size of outer sealing rib provides a greater sealing rib area. Each inner and outer sealing rib 90, 91 thus act in tandem to effectively seal each metering rod passage. The protrusion/cup functions as an alignment for seals 90, 91 and the double, radially spaced configuration has shown itself to be a good arrangement to produce an effective seal.

In the preferred embodiment, nozzle 13 is harder than the plastic of gun body 12 so that sealing ribs 90, 91 will deform flat end surface 74 to effect sealing of nozzle 13 to gun body 12. However, the deformation from sealing is not beyond the memory of the plastic so that permanent set is not experienced in the gun body and any number of nozzles can be repeatedly sealed to gun body 12. Nozzle sealing conventionally occurs in commercial applications by means of conventional O-rings and like resilient seals. However, in U.S. Pat. No. 4,925,107 to Brown, issued May 15, 1990 (and U.S. Pat. No. 5,129,581 to Braun et al., issued Jul. 14, 1992), a plastic seal is said to be formed by barbs in nozzle protrusions fitting within valve dispensing passages. This is not believed an especially effective seal at higher pressures of the gun application because a positive force, as in the present invention, is not constantly asserted against the seal. Note the nozzle is easily molded as a hollow, basically cylindrical molding. The static mixer is dropped into mixing chamber 59 and back plate 85 easily sealed into the recess. Thus the nozzle is sealed with entrance only through valve seat openings 75 and exit out only through dispensing tip 58. A long lever aim is used to latch the protrusions into the cup-shaped recesses with the large circumferential edge assuring alignment and sealing of recesses with protrusions. It should also be noted that a resilient strip flapper-type valve disclosed in the parent patent to positively prevent cross-over is not utilized in the nozzle of the present invention. While such flapper valve could be employed in the inventive nozzle, it has been determined that for many common applications the resilient strip is not necessary because cross-over in inlet chamber 60 has not been a serious problem.

Referring to FIGS. 4, 5, 7 and 13, it can be seen that the cross-sectional area of nozzle 13 at its entrance end, i.e., collar 76 is greater than the cross-sectional area of inlet chamber 60 at its exit end, i.e., the intersection with mixing chamber 59. The nozzle wall forming inlet chamber 60 has semi-circular portions 96 corresponding to nose edge surfaces 67, 68 which take the shape of truncated cones as the nozzle extends from its entrance to its exit end. Similarly, the wall forming nozzle chamber 60 also has top and bottom flat portions 97 corresponding to nose straight edge surfaces 69, 70 which assume a triangular shape as inlet chamber 60 transitions from its entrance to its exit end. Generally speaking, inlet chamber 60 is in the shape of a funnel or a truncated cone. This configuration is believed to result in a somewhat smooth flow of the "A" and "B" liquid components into mixing chamber 59 as they travel through inlet chamber 60 after exiting valve seat extension openings 89. That is, significant mixing or contact of the "A" and "B" components does not occur while components are flowing through inlet chamber 60. It is, of course, understood that some quantity of the "A" and "B" components will contact one another at the center of inlet chamber 60. It is not believed that the contact is detrimental to the gun operation because the flow within inlet chamber 60 is somewhat non-turbulent. Contact at the nozzle center will thus occur at a somewhat laminar flow condition while the components are directed into the static mixer. Further, there may be some benefit to a slight mixing contact just prior to entering mixing chamber 59. The geometry of the centrally positioned valve seat protrusions 72, 73, within nozzle inlet chamber 60 which is frusto-conical provides a generally smooth, somewhat non-turbulent flow of the "A" and "B" components, maintained somewhat separately, to the inlet of static mixer. The flow does not experience any impingement against corners or dead end against any flat wall surfaces. Thus, the non-turbulent type flow of the "A" and "B" components within gun body 12 is carried through nozzle 13.

Once the "A" and "B" components reach mixing chamber 59 and pass through the static mixer, the components are mixed and will react to produce polyurethane foam. As the liquids are mixed into a plurality of streams they are recombined into one stream in dispensing tip 58 and the opening at the end of the dispensing tip 58 determines the shape of the spray pattern. Typically a circular opening such as shown in the nozzle of the parent application (i.e. FIGS. 1 and 2) is used and will produce a cone spray pattern which in turn will produce a circular foam pattern on a wall impinged by the spray. As indicated in the Background, some applications require a different spray pattern and it is difficult to maintain a consistent spray pattern over the range of operating conditions of gun 10.

After considering a number of different opening configurations in dispensing tip 58 it was determined that a rectangular opening at the exit end of dispensing tip 58 having a preferred relationship with respect to the sizing of mixing chamber 59 gave markedly superior spray pattern consistencies over the operating range of dispensing gun 10. The rectangular opening at the exit end of dispensing tip 58 is defined by two long side edges 100 intersecting two short side edges 101. For reference purposes the long side edges 100 will be referred to as the length or height of tip opening and the short side edges 101 will be referred to as the width of rectangular tip opening. In the preferred embodiment the length is vertical and in the direction of handle 18 and trigger 20 and fixed vertically vis-a-vis latch 83. However, long side edges 100 could be fixed horizontally or at any angle relative to vertical.

The passage within dispensing tip 58 through which the mixed "A" and "B" components flow is configured to have a "length" corresponding to long side edges 100 which is substantially constant throughout the axial or longitudinal distance of dispensing tip from the intersection 103 with the exit end of mixing chamber 59 to the rectangular exit opening of dispensing tip 58. This is shown in nozzle sectional view FIG. 7 which is taken in the x-z plane and one of the "length" surfaces of dispensing tip passage is designated by reference numeral 105A. Further, the length of long side edge 100 is approximately equal to the diameter of mixing chamber 59 as indicated by the dimension designated by reference letter "x" in FIG. 7. In the preferred embodiment, long side 100 is set at 0.290" and the diameter of mixing chamber 59 at its exit end 103 is 0.295". "Approximately" as used herein with respect to dimensioning means within a hundredth of an inch. Thus, if the long side was approximately equal to a mixing chamber diameter of 0.29", the dimension of long side could be between 0.280" to 0.300". Also, for definitional purposes, "substantially" when used herein with respect to dimensioning means more than 50% of the dimension. Thus, surfaces described as flat over substantially the length of tip passage means the surface is flat for 50% or more of the longitudinal distance of the passage.

Figure 6:
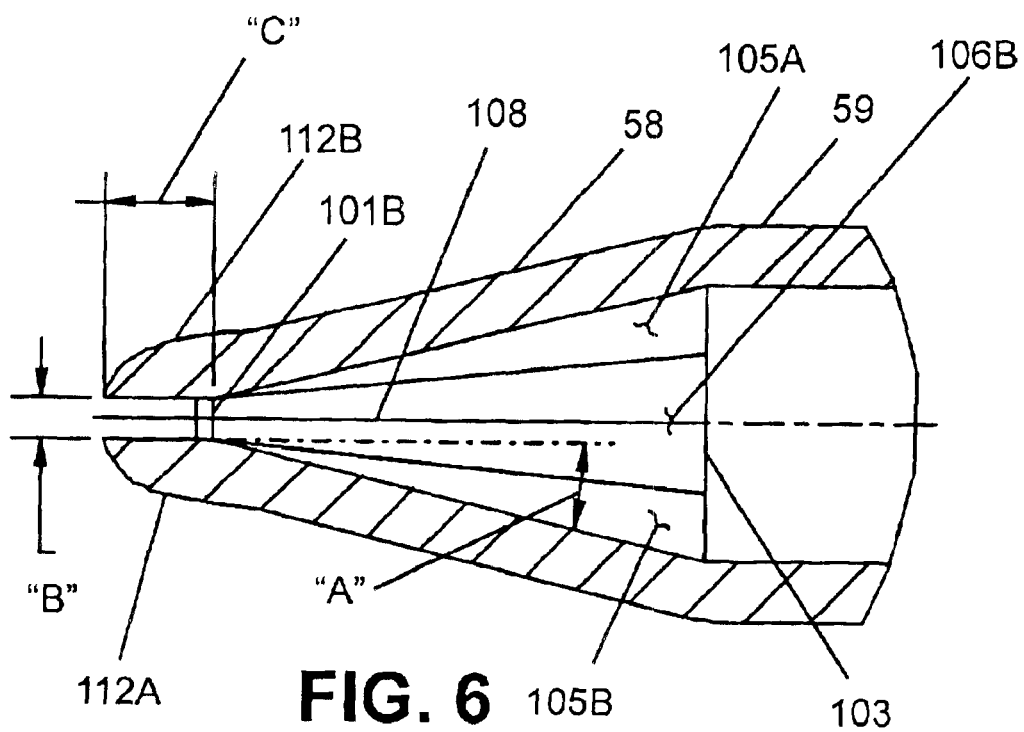
FIG. 6 is an enlarged view of the nozzle dispensing tip shown in FIG. 5.

Referring now to FIGS. 5 and 6, the nozzle is sectioned in the y-x plane and FIG. 6 shows that short side edges 101 of the tip rectangular opening tapers in an increasing manner until intersecting with exit end 103 of mixing chamber 59. The bottom short side "width" surface of dispensing tip passage is designated by reference numeral 106B. In the preferred embodiment, the distance of short sides 101 is 0.044" and designated by reference dimension "B" and the taper of short side 101 (i.e. the "width" of the nozzle passage) at the intersection 103 with mixing chamber 59 is set at about three times the nozzle width. Tests were not conducted to determine the affect of varying the width taper, nor were tests conducted on varying the longitudinal distance of dispensing passage (which for the preferred embodiment is determined by a taper indicated by angular dimension "A" of 13.3°). It is believed, based on results obtained during testing that the width of the nozzle slot has to at least be maintained throughout the dispensing tip passage.

As to the shape of the "width" and "length" surfaces 105, 106 in the dispensing tip passage, generally the width surface 106 (bottom width surface designated 106B in FIG. 6) is flat in the preferred embodiment and also canted (i.e. two flat surfaces) from a width center line designated by reference numeral 108. As width surface 106 approaches intersection 103 of mixing chamber 59, it blends curvilinearly into mixing chamber 59. Generally, width surface 106 can be viewed as being flat for a substantial portion (more than 50%) of the longitudinal distance of dispensing tip passage. The length surface 105 of dispensing tip passage in the preferred embodiment is curvilinear blending into a flat surface adjacent long side edges 100 of the rectangular tip opening. While the "width" flat surface and curvilinear "length" surface of the dispensing tip passage is preferred, other surface configurations may be able to function with somewhat acceptable results. Particularly the length surface could also be flat (like the width surface) and blend curvilinearly into intersection 103 of mixing chamber 59.

In general summary the dispensing tip produces the improved spray pattern (which is a fan pattern that produces a rectangular pattern when sprayed to impinge a flat wall surface) by constructing the exit opening of dispensing tip 58 as a rectangular opening, sizing the long side edge 100 of the rectangular opening to generally equal the diameter of mixing chamber 59 and shaping the interior passage of dispensing tip 58 to continue the rectangular opening while blending the surfaces of the passage to smoothly transition to mixing chamber 59.

An additional feature of the invention was found to occur by forming a pair of spray guide tabs 112A, 112B, each of which extends from a long side edge 100 of rectangular opening. It was found by providing tabs 112 that foam drip during dispensing was alleviated. It is believed the surface area of tabs 112 provide a blow-off or swiping area for the spray and because of the narrow short side edge 101, any spray droplets which may tend to form on shut-off remain within spray guide tabs 112A, 112B. It should also be recognized that drip shut-off is a function of the gun design. In this connection the straight through metering design of gun 10 and nozzle 13 produces a good "blow-off" of the spray between spray guide tabs 112A, 112B keeping their surfaces clean of spray during dispensing gun operation. The valve protrusions provide positive shut-off by metering rods 28 and this feature of the gun in combination with spray guide tabs 112A, 112B is believed to alleviate drip.

In the preferred embodiment, the outer or exposed circumferential edge of spray guide tabs 112A, 112B is curvilinear, in fact circular. By rounding off the tip, this eliminates potential collection points (or sharp edges) for the emerging froth chemical to collect (stick on) and drip. However, other edge configurations could be used. In the preferred embodiment the length of tabs 112 from rectangular opening is designated by reference dimension "C" and is set at 0.118". Tab length i.e., surface area, is important for drip alleviation.

It is to be appreciated that the interaction between the "A" and "B" components within nozzle 13 are complex. Further, the words "laminar" and "turbulent" are not used herein in their strict, classical sense but are used in a relative sense. The "quiescent" nature of inlet chamber 60 is believed verified by tests. In these tests, dispensing gun 10 was actuated to shoot foam and the gun and nozzle was left undisturbed for various lengths of time before the gun was reshot with the original nozzle in place. Again, and as noted in the Background, nozzle/gun design, formulation and environmental conditions are all factors contributing to nozzle clogging so that data reported cannot be attributed to the nozzle per se. Nevertheless, observations noted for tests conducted on a consistent basis are noted as follows:

| Test # | Length of Time Between Shots | Observations |
| --- | --- | --- |
| 1 | 30 sec. | No effect to dispensing seen |
| 2 | 1 min. | No observable defect - Note: This is time limit of current gun nozzle w/std. System. |
| 3 | 2 min. | Very slight observable effect to spray pattern, but gun and nozzle still operable |
| 4 | 3 min. | Initially spray pattern is effected, but "plug" of cured foam forced out by pressure of spray to make nozzle still operable |
| 5 | 4 min. | Similar to test #4, but plug more reticent to remove |
| 6 | 5 min. | Spray pattern is visibly effected. Plug must be physically removed, but gun and nozzle still operable - no crossover. |

As a comparison, conventional dispensing guns (with one known exception) will generally clog to a point of inoperability within about one to two minutes of inactive use following initial spraying. The nozzles of conventional dispensing guns are generally cylindrical with end walls that the "A" and "B" components impinge or dead end before exiting the nozzle. This impingement is believed to produce "turbulent" flow. The known exception relates to nozzle design where a central wall in the nozzle divides the nozzle into two separate compartments such as shown in U.S. Pat. No. 5,462,204. Since the nozzle has two compartments, the "clogging time" has been stated (and verified by tests) to be in the range of five minutes. The nozzle of the present invention, without being compartmentalized, approaches that clogging time, but without incurring the potential "downside" believed caused by the wall in gun operation. That is, it is believed that the presence of wall (in combination with the shape of the mixing chamber and also in combination with the non-linear flow through the gun) limits the ability of the gun to dispense the "A" and "B" components at full or high flow gun applications. In short, a resistance is believed created within the nozzle's inlet chamber which adversely effects full flow through the nozzle. This is not believed to occur in funneled nozzle 60 without any dividing wall.

As discussed consistent spray patterns are obtained with the rectangular opening in dispensing tip nozzle. Viscosities of the "A" and "B" components can vary anywhere from 200 to 3000 centipoise (before charging "A" and "B" containers with gas) and variations in pressures of the portable "A" and "B" gas charged cylinders for which gun 10 was designed can vary anywhere from 25 to 325 psig. Good, sharp spray patterns with even dispersions of the foam throughout the pattern have been observed with variations of spray components within this range. It is believed, although not tested, that nozzle 13 will produce good spray patterns with pressures as high as 500 to 1000 psig.

The invention has been described with reference to a preferred and alternative embodiments as depicted in the drawings. Alterations and modifications will become apparent to those skilled in the art upon reading and understanding the Detailed Description of the Invention set forth above. It is intended to include all such alterations and modifications insofar as they come within the scope of the present invention.

Having thus defined the invention, it is claimed:

1. In a detachable, throw away nozzle for use in an airless, liquid spray dispensing gun having a pair of valved openings through which pressurized liquids are dispensed, said nozzle having an inlet chamber section adjacent to and in sealing engagement with said valved openings, a mixing chamber section adjacent said inlet chamber and containing a static mixer therein, and a dispending tip adjacent said mixing chamber through which said liquids are dispensed from said nozzle, the improvement comprising:

a) said dispensing tip, said mixing chamber and said inlet chamber extending along a longitudinal axis and generally symmetrical about said longitudinal axis;

b) said dispensing tip defined by a longitudinally extending interior passage through which said liquids are dispensed, said tip passage having a generally circular entrance end at the intersection of said tip passage with said mixing chamber and a longitudinally opposite exit end having a rectangular dispensing opening defined by a pair of long side length edges joined at each end by a pair of short side width edges, said long side edges approximately equal to the diameter of said entrance end of said tip passage;

c) said tip passage configured to generally maintain the outline of said rectangular dispensing tip opening through a substantial distance of the dispensing tip passage whereby the length edge distance of said rectangular opening is maintained generally constant throughout the substantial length of said dispensing tip while the passage substantially tapers to the width of said rectangular opening from said inlet end of said dispensing tip, said dispensing passage having a first surface adjacent and extending from said short side edges which is generally flat and a second surface extending from said long side edges which is generally curvilinear.

2. The nozzle of claim 1 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

3. The nozzle of claim 2 wherein said circumferential edge of said fan tab is curvilinear.

4. The nozzle of claim 3 wherein said dispensing passage has a first surface adjacent and extending from said short side edges which is generally flat and a second surface extending from said long side edges which is generally curvilinear.

5. A removable, throw-away nozzle for a two-component polyurethane spray gun having a face surface with outlets through which the polyurethane components are dispensed under pressure when said gun is activated, said nozzle comprising:

a longitudinally extending, hollow inlet chamber section with a latch and sealing mechanism for sealingly attaching and removing said nozzle to said outlets in said gun face;

a generally cylindrical, longitudinally extending, hollow mixing chamber section extending from said inlet chamber and containing a static mixer therein and;

a hollow dispensing tip longitudinally extending from said mixing chamber, said tip having a rectangular opening in its exposed end defined by generally parallel long side edges intersecting a pair of generally parallel short side edges, said hollow forming a tip passage longitudinally extending from the intersection of said tip with said mixing chamber to said rectangular opening, said tip passage having generally straight first surfaces substantially tapering from said short side edges of said rectangular opening towards said intersection of said dispensing tip with said mixing chamber and intersecting with a second tapering surface extending from said long side edge of said rectangular opening towards said intersection of said dispensing tip with said mixing chamber, said second surfaces having a generally constant length equal to said long side edges, and further wherein said long side length is approximately equal to the diameter of said exit end of said mixing chamber end and said dispensing passage has a first surface adjacent and extending from said short side edges which is generally flat and a second surface extending from said long side edges which is generally curvilinear.

6. The nozzle of claim 5 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

7. The nozzle of claim 6 wherein said circumferential edge of said fan tab is curvilinear.

8. The nozzle of claim 5 wherein said latch mechanism fixes said nozzle to said gun face surface at a set relationship thereto and said long side edges are vertical whereby a fan shaped, vertically extending, rectangular spray pattern results when said gun is held in its normally operating position with said long edges vertical.

9. A polyurethane foam dispensing gun comprising:
   a) a gun body having a pair of longitudinally extending laterally spaced rod passages terminating at one axial end in a valved opening formed in cup-shaped protrusions extending from a generally flat nose surface on said gun body, each rod passage in fluid communication with a feed passage carrying components of polyurethane foam and containing a spring biased metering rod with seals at a spaced distance from said valved opening and axially movable in said rod passage by an operator controlled triggering mechanism;
   b) a nozzle mounted to said front face having a longitudinally extending inlet chamber section adjacent said front face, a generally cylindrical mixing section adjacent said inlet chamber section and a dispensing tip section adjacent said mixing section;
   c) said dispensing tip having a rectangular opening at its end defined by long and short side edges through which mixed polyurethane components are discharged from said gun, said dispensing tip having an interior dispensing passage longitudinally extending from said mixing chamber section to said rectangular opening, said passage having a substantially constant height surface extending from said long side edges and approximately equal to the diameter of said mixing chamber, said height surface tapering from said mixing chamber section to said short side edges, and further wherein said dispensing passage has a first surface adjacent and extending from said short side edges which is generally flat and a second surface extending from said long side edges which is generally curvilinear.

10. The gun of claim 9 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

11. The gun of claim 9 wherein said circumferential edge of said fan tab is curvilinear.

12. The gun of claim 9 wherein said inlet chamber section has a backplate adjacent said front face with a pair of cup shaped recesses formed therein receiving said protrusion, each cup having an inner sealing rib and a concentric outer sealing rib at its base for sealingly contacting the front end of each protrusion.

13. The gun of claim 12 wherein said outer sealing rib is sized to deform more readily than said inner sealing rib.

14. In a detachable, throw away nozzle for use in an airless, liquid spray dispensing gun having a pair of valved openings through which pressurized liquids are dispensed, said nozzle having an inlet chamber section adjacent to and in sealing engagement with said valved openings, a mixing chamber section adjacent said inlet chamber and containing a static mixer therein, and a dispending tip adjacent said mixing chamber through which said liquids are dispensed from said nozzle, the improvement comprising:
   a) said dispensing tip, said mixing chamber and said inlet chamber extending along a longitudinal axis and generally symmetrical about said longitudinal axis;
   b) said dispensing tip defined by a longitudinally extending interior passage through which said liquids are dispensed, said tip passage having a generally circular entrance end at the intersection of said tip passage with said mixing chamber and a longitudinally opposite exit end having a rectangular dispensing opening defined by a pair of long side length edges joined at each end by a pair of short side width edges, said long side edges approximately equal to the diameter of said entrance end of said tip passage;
   c) said tip passage configured to generally maintain the outline of said rectangular dispensing tip opening through a substantial distance of the dispensing tip passage whereby the length edge distance of said rectangular opening is maintained generally constant throughout the substantial length of said dispensing tip while the passage substantially tapers to the width of said rectangular opening from said inlet end of said dispensing tip; and
   d) said tip passage configured such that said short side edges extend as a first surface from said rectangular opening towards said mixing chamber as flat surfaces tapering outwardly until blending into said circular exit of said mixing chamber, said long side edges extending into said passage as a curvilinear second surface blending into said mixing chamber circular exit and blending from said rectangular tip opening as said generally flat surface and smoothly transitioning from said cylindrical nozzle passage to a cubic, box-like passage.

15. The nozzle of claim 14 wherein said dispensing passage has a first surface adjacent and extending from said short side edges which is generally flat and a second surface extending from said long side edges which is generally curvilinear.

16. The nozzle of claim 15 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

17. The nozzle of claim 16 wherein said circumferential edge of said fan tab is curvilinear.

18. The nozzle of claim 17 wherein said dispensing passage has a first surface adjacent and extending from said short side edges which is generally flat and a second surface extending from said long side edges which is generally curvilinear.

19. A removable, throw-away nozzle for a two-component polyurethane spray gun having a face surface with outlets through which the polyurethane components are dispensed under pressure when said gun is activated, said nozzle comprising:
   a longitudinally extending, hollow truncated cone-shaped inlet chamber section with a latch and sealing mechanism for sealingly attaching and removing said nozzle to said outlets in said gun face;
   a generally cylindrical, longitudinally extending, hollow mixing chamber section extending from said inlet chamber and containing a static mixer therein;

a hollow dispensing tip longitudinally extending from said mixing chamber, said tip having a rectangular opening in its exposed end defined by generally parallel long side edges intersecting a pair of generally parallel short side edges, said hollow forming a tip passage longitudinally extending from the intersection of said tip with said mixing chamber to said rectangular opening, said tip passage having generally straight first surfaces substantially tapering from said short side edges of said rectangular opening towards said intersection of said dispensing tip with said mixing chamber and intersecting with a second tapering surface extending from said long side edge of said rectangular opening towards said intersection of said dispensing tip with said mixing chamber, said second surfaces having a generally constant length equal to said long side edges; and a cross-sectional area of said inlet chamber at a position adjacent said nose surface of said dispensing gun is larger than a cross-sectional area of said inlet chamber at a position between said inlet chamber with said mixing chamber.

20. The nozzle of claim 19 wherein said long side length is approximately equal to the diameter of said exit end of said mixing chamber end and said dispensing passage has a first surface adjacent and extending from said short side edges which is generally flat and a second surface extending from said long side edges which is generally curvilinear.

21. The nozzle of claim 20 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

22. The nozzle of claim 21 wherein said circumferential edge of said fan tab is curvilinear.

23. The nozzle of claim 19 wherein said latch mechanism fixes said nozzle to said gun face surface at a set relationship thereto and said long side edges are vertical whereby a fan shaped, vertically extending, rectangular spray pattern results when said gun is held in its normally operating position with said long edges vertical.

24. A polyurethane foam dispensing gun comprising:

a) a gun body having a pair of longitudinally extending laterally spaced rod passages terminating at one axial end in a valved opening formed in cup-shaped protrusions extending from a generally flat nose surface on said gun body, each rod passage in fluid communication with a feed passage carrying components of polyurethane foam and containing a spring biased metering rod with seals at a spaced distance from said valved opening and axially movable in said rod passage by an operator controlled triggering mechanism;

b) a nozzle mounted to said front face having a longitudinally extending inlet chamber section adjacent said front face, a generally cylindrical mixing section adjacent said inlet chamber section and a dispensing tip section adjacent said mixing section;

c) said dispensing tip having a rectangular opening at its end defined by long and short side edges through which mixed polyurethane components are discharged from said gun, said dispensing tip having an interior dispensing passage longitudinally extending from said mixing chamber section to said rectangular opening, said passage having a substantially constant height surface extending from said long side edges and approximately equal to the diameter of said mixing chamber, said height surface tapering from said mixing chamber section to said short side edges;

d) said tip passage configured such that said short side edges extend as a first surface from said rectangular opening towards said mixing chamber as flat surfaces tapering outwardly until blending into said circular exit of said mixing chamber, said long side edges extending into said passage as a curvilinear second surface blending into said mixing chamber circular exit and blending from said rectangular tip opening as said generally flat surface and smoothly transitioning from said cylindrical nozzle passage to a cubic, box-like passage; and e) a cross-sectional area of said inlet chamber at a position adjacent said nose surface of said dispensing gun is larger than a cross-sectional area of said inlet chamber at a position between said inlet chamber with said mixing chamber.

25. The gun of claim 24 wherein said dispensing passage has a first surface adjacent and extending from said short side edges which is generally flat and a second surface extending from said long side edges which is generally curvilinear.

26. The gun of claim 24 further including a spray guide tab protrusion extending longitudinally from each long side edge of said rectangular opening, each spray guide tab having an exposed circumferential edge extending from the intersection of one short side edge with a long side edge of said rectangular opening to the intersection at the opposite end of said one long side edge with the other one of said short side edges.

27. The gun of claim 24 wherein said circumferential edge of said fan tab is curvilinear.

28. The gun of claim 24 wherein said inlet chamber section has a backplate adjacent said front face with a pair of cup shaped recesses formed therein receiving said protrusion, each cup having an inner sealing rib and a concentric outer sealing rib at its base for sealingly contacting the front end of each protrusion.

29. The gun of claim 28 wherein said outer sealing rib is sized to deform more readily than said inner sealing rib.

* * * * *